United States Patent [19]

Funk

[11] 4,126,000
[45] Nov. 21, 1978

[54] SYSTEM FOR TREATING AND RECOVERING ENERGY FROM EXHAUST GASES

[76] Inventor: Harald F. Funk, 68 Elm St., Murray Hill, N.J. 07974

[21] Appl. No.: 674,219

[22] Filed: Apr. 6, 1976

Related U.S. Application Data

[63] Continuation-in-part of Ser. No. 565,045, Apr. 4, 1975, Pat. No. 3,970,524, which is a continuation-in-part of Ser. No. 486,562, Jul. 8, 1974, abandoned, which is a continuation-in-part of Ser. No. 252,610, May 12, 1972, abandoned.

[51] Int. Cl.² ............................................. F01K 21/00
[52] U.S. Cl. ......................................... 60/648; 60/670; 60/645; 60/643; 55/23; 55/68; 55/73
[58] Field of Search ................... 62/12, 14, 23; 55/23, 55/68, 73; 60/648, 670, 643, 645, 685, 690

[56] References Cited

U.S. PATENT DOCUMENTS

| | | | |
|---|---|---|---|
| 2,753,701 | 7/1956 | Palmer et al. | 62/14 |
| 3,618,331 | 11/1971 | Smith et al. | 62/23 |
| 3,905,784 | 9/1975 | Kelleher et al. | 55/73 X |
| 3,926,582 | 12/1975 | Powell, Jr. et al. | 201/2.5 |
| 3,970,524 | 7/1976 | Funk | 201/236 |

*Primary Examiner*—Allen M. Ostrager
*Attorney, Agent, or Firm*—Sixbey, Friedman & Leedom

[57] ABSTRACT

The sensible and latent heat of hot exhaust gases generated in fuel burning furnaces, roaster, cement kilns, and the like is transferred to a power fluid in the boiler of an external combustion engine. The cooled gases are purified by subliming or "freezing out" harmful, less volatile components. The purified gases are discharged to atmosphere without using flue gas stacks. The sublimed or "frozen out" impurities are collected and neutralized.

23 Claims, 2 Drawing Figures

SYSTEM FOR TREATING AND RECOVERING ENERGY FROM EXHAUST GASES

REFERENCE TO RELATED AND RELEVANT PATENT AND APPLICATIONS

The present application is a continuation-in-part of application Ser. No. 565,045 filed Apr. 4, 1975, (now U.S. Pat. No. 3,970,524 issued July 20, 1976 here the "Waste System Patent") as a continuation-in-part of application Ser. No. 486,562 filed July 8, 1974 (now abandoned) as a continuation-in-part of application Ser. No. 252,610 filed May 12, 1972 (now abandoned), the disclosures of which are incorporated by reference.

"Power Fluids For Rankine Cycle Engines," U.S. Pat. No. 3,702,534 issued Nov. 14, 1972 to Max F. Bechtold (here the "Rankine Engine Patent") the disclosure of which is incorporated by reference.

BACKGROUND OF THE INVENTION

1. Field of the Invention

The present invention relates generally to the treatment of exhaust gases for discharge to atmosphere, and more particularly to methods and apparatus for treating and recovering energy from hot exhaust gases.

Exhaust gases suitable for treatment by the system of the present invention include combustion exhaust gases produced in fuel burning furnaces, roasters and the like, exhaust gases such as those produced in cement kilns and the like, and exhaust gases containing such components as nitrogen, carbon dioxide, carbon monoxide, hydrogen chloride, hydrogen sulfide, hydrocarbon gases, and the like. Preferably the exhaust gases are essentially inert but include noxious components and traces of combustible gases.

2. Prior Art

Hot exhaust gases generated during the combustion of fuel have commonly been disposed of by exhausting them to atmosphere through tall chimneys or stacks. Disadvantages of this method of disposal include resulting air pollution and its harmful effects on the environment, a waste of recoverable heat energy, and the high cost of constructing and maintaining tall stacks. Loss of recoverable heat energy is unavoidable because gases discharged into a stack must be substantially hotter than ambient air to produce an up draft in the stack and to avoid condensation. Moreover, the latent heat of steam in flue gases has not been recovered in an effort to avoid condensation and corrosion, whereby additional heat energy has been wasted.

Where the latent heat of steam is not recovered, the system designer must work with "low heating values" of the gases rather than "high heating values". Low and high heating values for gases are given in such handbooks as the John N. Perry *Engineering Manual*, published in 1959 by McGraw Hill, where the following typical heating values are given:

| Gas | High Heating Value | Low Heating Value |
| --- | --- | --- |
| Hydrogen | 60,958 Btu/lb | 51,571 Btu/lb |
| Methane | 23,861 Btu/lb | 21,502 Btu/lb |
| Methyl alcohol (vapor) | 10,270 Btu/lb | 9,080 Btu/lb |

As will be apparent from these heating values, about 18 percent more Btu/lb can be recovered from hydrogen if its high heating value can be utilized, about 11 percent more from methane, and about 13 percent more from methyl alcohol vapor. Prior systems have not been able to utilize the high heating value of such gases.

As concerns about air pollution have increased, stack heights have been increased to effect better dispersion of pollutants. Increasing stack height adds to the cost of constructing and maintaining stacks, and provides no solution to the emission of harmful substances such as sulfur oxides, chlorine gases, phosphor oxides, etc.

A significant factor in air pollution is the increasing level of airborne oxide pollutants such as carbon dioxide, and sulfur dioxide as well as chlorine and fluorine gases, which combine with moisture in the air to produce acids. The carbon dioxide content in some industrial districts is as high as ten times normal. Acid forming pollutants have been found in some instances to increase the acidity of rainwater from its normal pH of about 6.9 to values of 4.0. Rainwater having a pH of 5.5 or less will destroy aquatic life and can do substantial harm to buildings, monuments, and other structures.

One proposal for removing acid forming components from exhaust gases is to scrub the entire flow of exhaust gases with water prior to discharging them through a stack. Scrubbing the entire exhaust gas flow requires large quantities of water which are not always available, and requires costly, large capacity scrubbing equipment. Scrubbing the entire flow of exhaust gases from some incinerators requires at least half the amount of water, by weight, of the solid wastes burned in the incinerator. Treating the large volume of scrub water used in such process is very costly, if not totally impractical.

One prior proposal for the desulfurization of flue gas utilizes a series of heat exchangers to extract heat energy from the flue gas prior to a scrubbing operation. Heat extracted from the gas is returned to the gas following desulfurization and the gas is exhausted through a tall stack for diffusion into the atmosphere. This proposal has the disadvantages of wasting heat energy recovered from the gases, requiring large volumes of scrubbing water, requiring the use of a tall stack, and polluting the air with such noxious components as are not removed during scrubbing.

The problem of disposing of exhaust gases is now recognized as a major concern in industrial countries throughout the world. Dispersing emissions through the use of tall stacks is no longer regarded as an acceptable solution.

THE PARENT WASTE SYSTEM PATENT

The Parent Waste System Patent describes a system for gasification of solid waste materials and for treating the resulting gases to produce commercially usable gases. A feature of one system embodiment described in this patent is the pressurization of a combustion zone to such pressures as will permit blower and compression units to be eliminated from the gas treatment system. Another feature is the use of a multichamber gas treatment unit where noxious gas components are sublimed or "frozen out" and thereby separated from the clean usable gas components. A problem not addressed by the parent patent is that of providing a system for treating combustion exhaust gases and productively reclaiming heat energy from the hot gases.

SUMMARY OF THE INVENTION

The present invention overcomes the foregoing and other drawbacks of the prior art, and provides novel and improved methods and apparatus for treating and recovering heat energy from hot exhaust gases.

Exhaust gases are treated by separating out solid particles, by cooling the gases and using recovered heat energy to heat a power fluid in the boiler of an external combustion engine, by subliming or "freezing out" harmful, less volatile components of the gases for subsequent neutralization, and by exhausting the purified, cooled gases to atmosphere without using a stack. Combustible components of the neutralized gases are preferably reclaimed and used.

One advantage of the system of the present invention is that it obviates the need for costly stacks. Another advantage is that it utilizes sublimation or "freezing out" processes to separate out harmful gas components which can then be recovered and treated or neutralized as by scrubbing with far less water than would be required if the entire flow of exhaust gases were to be scrubbed as in prior proposals. The small volume of scrub water required for this operation can be treated at minimal cost with scrubbing equipment having a much smaller capacity than is required where the entire flow of exhaust gas is scrubbed. Substantial savings are achieved over prior processes inasmuch as large capacity scrubbing equipment is not required.

Gas treatment apparatus of the type described in the referenced Waste System Patent is used to effect a separation of harmful, less voltile exhaust-gas components. The apparatus includes an arrangement of valve interconnected, packed, refrigerated towers through which exhaust gas passes to effect sublimation or "freezing out" of harmful components. Components which can be removed by this process include $CO_2$, $HCl$, $H_2S$, $SO_2$, $C_2H_2$, $NO_x$, $HCN$, $SO_3$ and the like.

Still another advantage of the system of the present invention lies in its recovery and utilization of heat energy to operate an external combustion engine. The referenced Rankine Engine Patent describes one such external combustion engine together with suitable power fluids for use with the system of the present invention.

A feature of apparatus used in the preferred practice of the present invention is a two stage heat exchanger where both sensible and latent heat is extracted from exhaust gases. In a first stage of the heat exchanger, gases are reduced to a temperature near but still above their dew point. In the second stage, a further temperature reduction is effected causing water vapor in the gases to condense and transfer latent heat.

Still another feature of the present invention is that a substantial volume of water is recovered in the second stage of the heat exchanger. The recovered water may be reused in subsequent scrubbing of noxious gas components. Whereas prior processes have consumed substantial quantities of water in the treatment of gases, the process of the present invention recovers more water than it requires for gas scrubbing.

Inasmuch as the system of the present invention provides a relatively simple and inexpensive method of purifying flue gases, it also permits the use of cheap fuels having a relatively high sulfur content. The savings which result from the use of cheaper fuels, the elimination of tall stacks, the recovery of energy from the gases, the elimination of large uses of scrub water, and the reduction in size of required scrubbing equipment make the system economically attractive for installations of a wide range of sizes. Moreover, where the exhaust gases being treated contain a relatively high concentration of sulfur, sulfur dioxide and elemental sulfur may be recovered from the gases thereby adding to the economy of operation of the system.

In the preferred embodiment of the present invention, exhaust gases are generated in the firebox of a combustion system, and the firebox is operated under sufficient pressure to obviate the need for blowers and compressors in the exhaust gas treatment system. By concurrently pressuring the combined combustion and gas treatment system with a compressor upstream from the combustion system, the need for compression equipment downstream from the combustion system is eliminated. Moreover combustion efficiency can be enhanced by operating the combustion system under positive pressure.

An additional feature of the present invention is that it permits noxious gases from many sources to be treated concurrently, thereby obviating the need for several separate gas treatment apparatus installations. Off gases from refinery equipment and the like can be collected and transferred through a sewer-like system of conduits and treated at a single installation with apparatus embodying the invention.

Still another feature of the system of the present invention is that the vast majority of the gas treatment process it employs is of a physical nature. Chemical treatment is not utilized until noxious gas components which comprise only a small fraction of the total gas flow are separated out.

An additional feature of the present invention is that purified gases which discharge at the conclusion of the treatment process are absolutely dry and can be used efficiently in evaporative cooling towers and the like.

A general object of the present invention is to provide novel and improved apparatus for treating exhaust gases to remove harmful components.

Another object is to provide novel and improved methods and apparatus for treating exhaust gases to permit their discharge directly to atmosphere without the need for tall chimneys or stacks.

Another object is to provide novel and improved methods and apparatus for recovering heat energy from hot exhaust gases.

Still another object is to provide a system for treating hot exhaust gases to recover heat energy therefrom and to sublime or "freeze out" certain harmful, less volatile components.

These and other objects and a fuller understanding of the invention may be had by referring to the following description and claims taken in conjunction with the accompanying drawings.

DESCRIPTION OF THE PREFERRED EMBODIMENT

Figure 1:
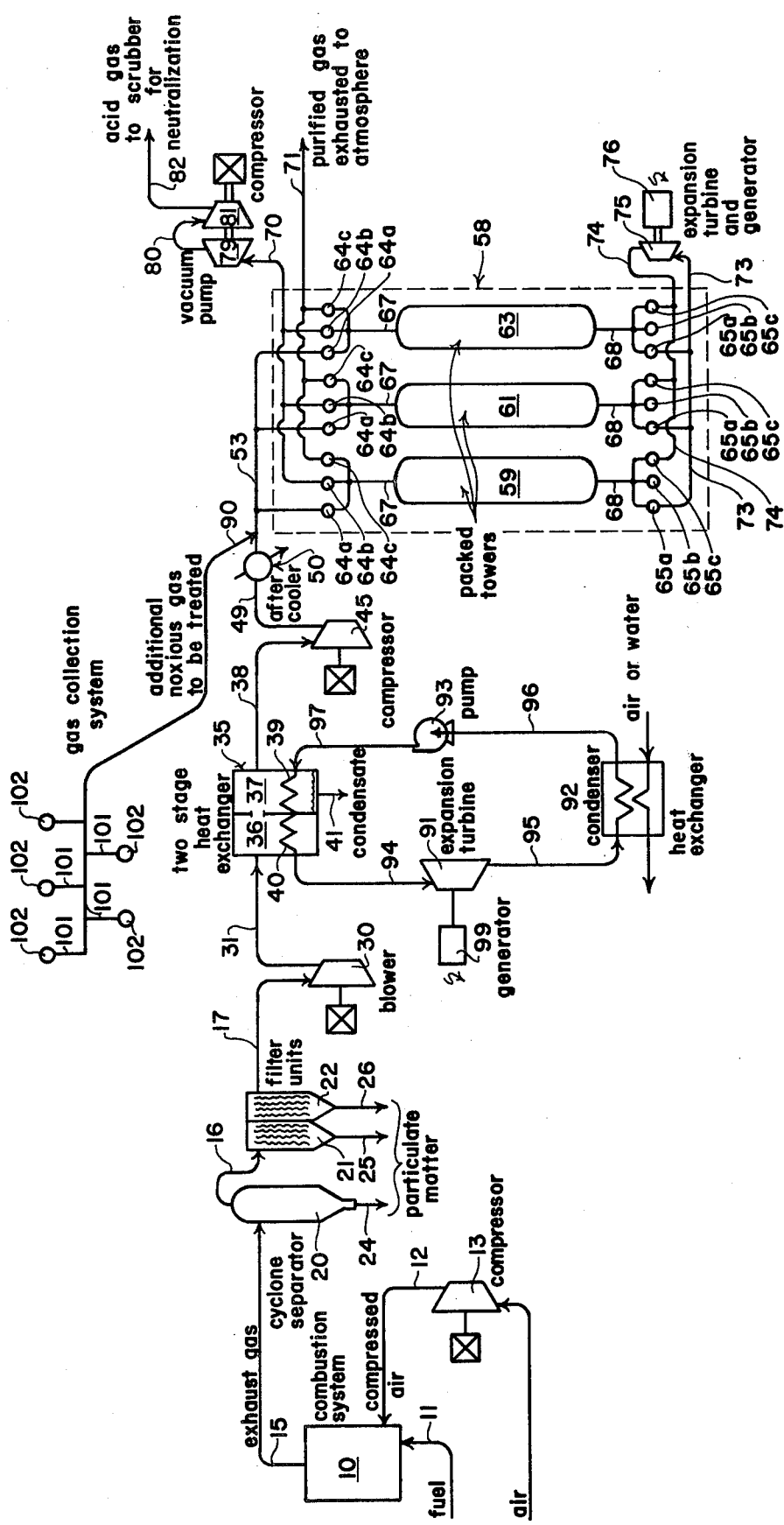
FIG. 1 is a schematic flow diagram of an apparatus for practicing the present invention.

Referring to FIG. 1, a combustion or other gas producing system is indicated generally by the numeral 10. The system 10 can include one or more fuel burning furnaces, roasters, cement kilns and the like which emit hot exhaust gases as a product of fuel combustion and/or other chemical process which discharge hot exhaust gases containing such components as nitrogen, carbon dioxide, sulfur dioxide, hydrogen chloride, hydrogen sulfide, carbon monoxide, nitrogen oxide, hydrogen cyanide, and hydrocarbon components.

Fuel is supplied to the combustion system 10 as indicated by an arrow 11. In preferred operation, the fuel used in the system 10 is inexpensive solid or liquid fuel having a relatively high sulfur content. This fuel is preferred due to its low cost and because the sulfur content is easily separated out of exhaust gases as will be explained.

Air or oxygen is supplied to the combustion system 10 as indicated by an arrow 12. In preferred practice, a compressor 13 is used to pressurize the air supply 12 such that the combustion system operates under pressure. Depending on the magnitude of the pressure maintained in the system 10, one or more downstream gas compression units may be eliminated from the exhaust gas treatment system of the present invention, as will be explained.

Exhaust gases generated by the combustion system 10 are ducted, as indicated by arrows 15, 16, 17 to and through a series of particle separation units 20, 21, 22. The separation unit 20 is preferably a cyclone separator, and particulate matter as small as 50 microns in size is separated out of the gases, as indicated by an arrow 24. The separation units 21, 22 house filters which remove smaller particles as indicated by arrows 25, 26. The units 20, 21, 22 are insulated to avoid heat loss.

Exhaust gases which have been cleaned of particulate matter are ducted to a blower 30, as indicated by the arrow 17. The blower 30 conveys the gases through the separation units 20, 21, 22 and discharges them into a conduit indicated by the numeral 31. Where the compressor 13 is included in the system of the present invention and operates at a sufficiently high pressure, e.g. 7 to 10 psig, the blower 30 can be eliminated.

The conduit 31 ducts exhaust gases to a heat exchanger 35. The exchanger 35 has first and second stages 36, 37 arranged in series. Exhaust gases pass through the stages 36, 37 and are discharged into a conduit indicated by the numeral 38.

As the gases pass through the stages 36, 37 they sacrifice sensible and latent heat to a power fluid which circulates in coils 39, 40. Inasmuch as the gases are cooled below their dew point in the heat exchanger 35, the latent heat of steam is recovered and part of the high heating value of the gases is recovered, unlike prior systems which recover only the low heating value of hot exhaust gases.

In the first stage 36, the exhaust gases are cooled to a temperature near but slightly above their dew point. In the second stage 37, the temperature of the exhaust gases is further reduced and moisture in the gases condenses. Condensate is withdrawn from the second stage 37 as indicated by an arrow 41 and is treated to reclaim the condensed water and to permit its use as a scrubbing fluid later in the process. As exhaust gases enter the first stage 36, they typically have a temperature of from 150° to 180° C. As the gases pass through the first stage 36, they are cooled to a temperature of from about 100° to 120° C. In the second stage 37, the gases are cooled to a nearly ambient temperature of between about 10° C. and 40° C.

The conduit 38 ducts cooled exhaust gases to a compressor 45. The compressor 45 conveys the gases through the heat exchanger 35 and discharges them at a pressure of about 3 atmospheres gage into a conduit indicated by the numeral 49. An aftercooler 50 serves to further cool the gases to a temperature of about 20° C. and discharges the gases into a gas feeder conduit indicated by the numeral 53.

The gas feeder conduit 53 ducts gases to a gas treatment and separation unit indicated generally by the numeral 58. The unit 58 is preferably of the same type described in the reference Waste System Patent and is operable to separate the gases into condensable and noncondensable components by subliming or "freezing out" noxious, condensable components of relatively low volatility and components having similar vapor pressures such as $C_3$ and $C_4$ fractions.

The unit 58 includes three similar packed towers or columns 59, 61, 63. Each of the towers 59, 61, 63 is similar to a regenerator described by Russel B. Scott at pages 29–31 of *Cryogenic Engineering*, published in 1959 by D. Van Nostrand Co., Princeton, N.J. Each of the towers 59, 61, 63 contains loose solids, for example, ceramic balls, quartzite pebbles, steel shot and other solids having large surface areas and capable of acting as heat capacitants and being resistant to corrosion.

Automatic switch valves 64a, 64b, 64c, and 65a, 65b, 65c are provided at opposite ends of the towers 59, 61, 63. Tower connection conduits 67, 68 communicate the towers 59, 61, 63 with the valves 64a, 64b, 64c and 65a, 65b, 65c.

The gas feeder conduit 53 connects with the valves 64a. An acid gas conduit 70 connects with the valves 64b. A purified gas discharge conduit 71 connects with the valves 64c.

A pair of transfer conduits 73, 74 connect with the valves 65a, 65c. An expansion turbine 75 communicates the transfer conduits 73, 74. A power generator 76 is coupled to the drive shaft of the turbine 75.

A vacuum pump 79 communicates with the acid gas conduit 70. A transfer conduit 80 communicates the pump 79 with a compressor 81. An acid gas discharge conduit 82 communicates with the compressor 81.

The manner by which gases are treated in the unit 58 may be visualized as that of subjecting the gases to several like cycles repeated time after time as long as exhaust gases are being produced by system 10. During each cycle, a different step is conducted simultaneously in each of the towers 59, 61, 63. While one of the towers is being cooled by a flow of cooled purified gas, separation is taking place in another tower, and condensed or sublimed components are being removed from the third tower.

A first step of one cycle is carried out by opening the valves 64a, 65a at each end of tower 59 and valves 64c, 65c at each end of tower 63. Gases will then flow through tower 59, will drive the turbine 67, and will flow through the tower 63. The gases expand in the turbine 67 with a pressure ratio drop in the range of about 1 to 5 or 1 to 10. As the gases expand, they are cooled and it is the flow of these cooled gases through the tower 63 that readies the tower 63 for a subsequent gas separation step. (It is assumed here that the tower 59 has already been pre-cooled in this manner so that less volatile gas components loaded into the tower 59 will be sublimed or "frozen out".) The gases are allowed to flow in this manner for a short period of time, for example, for about 6 to 8 minutes. Energy extracted from these gases by the turbine 75 is used to drive the generator 76.

Gas cools in tower 59, due to contact with the large surface area of the cooler solids in the tower 59. The turbine 67 expands the gas and delivers it at a pressure of typically about 5 psig into tower 63. The pressure at which the gases enter the tower 63 is not critical; what is required is that the pressure ratio reduction effected in the turbine 76 be of sufficient magnitude to adequately cool the gases so the gases can properly chill the tower 63. Less volatile components of the gas are condensed or converted into the solid phase in tower 59 while the more volatile, noncondensed or clean components of the gas pass out of tower 59 and through tower 63. This clean gas is purified by being freed from the "frozen out," sublimed or condensed components.

A second step (which is carried out simultaneously with the loading of exhaust gas into the tower 59 and the cooling of the tower 63) is that of revaporizing the "frozen out," sublimed or condensed components from a prior cycle. This step is carried out by closing the valves 65a, 65b, and 65c at the lower end of tower 61 and by connecting the other end of that tower through valve 64b to the pump 79 and compressor 81. The pump 79 operates to reduce the pressure in the tower 61 by a ratio of about 10 to 1. As pressure in the tower 61 is reduced, the "frozen out," sublimed or condensed components are revaporized to form an acid gas which is drawn out of the tower 61. The withdrawn acid gas is compressed by the compressor 81 and is discharged into the acid gas discharge conduit 82. The acid gas typically consists mainly of $CO_2$ with small amounts of $H_2S$, $SO_2$, $SO_3$, HCN and other noxious gases. Depending on the temperature in the lower end of the towers 59, 61, 63, part or all of the $C_2$ fraction may also be retained. Noxious gases, containing chlorine, sulfur and the like may be neutralized as by scrubbing with caustic solution preferably including water reclaimed from the heat exchanger 35. Combustible components of the neutralized gases are preferably separated out and retained for use. Such gases can be burned in the combustion apparatus 10.

The next cycle is like the one just described and consists of a first step of passing gases from the conduit 53 one of the valves 64a into the cooled tower 63, separating components of the gases in that tower, expanding the separated clean gas in the turbine 75 and passing cooled clean gas through the tower 61. A second step is that of simultaneously revaporizing the "frozen out," sublimed or condensed components which remain in the tower 59 from the prior cycle.

The next cycle is like the two foregoing cycles. Its first step is that of passing gases from the conduit 53 into the tower 61 and cooling the tower 59 with the separated clean gas fraction. A second step is to revaporize components remaining in the tower 63 from the previous cycle by withdrawing them through pump 79 and compressor 81.

The purified gases discharged into the conduit 71 can be exhausted to atmosphere without the use of a flue gas stack. Inasmuch as these gases are dry, they can be used to advantage in evaporative cooling towers and the like.

The acid gas discharged into the conduit 82 is transferred to a scrubbing unit where it is scrubbed with caustic solution that preferably includes water condensed in the second stage of the heat exchanger 35.

Noxious gases created in chemical processes other than combustion can be mixed with gases in the feeder conduit 53 and treated in the unit 58. The addition of such gases is indicated by an arrow 90 in FIG. 1. A sewer-like blow down system of gas collection conduits 101 can be used to collect exhaust gases from a plurality of gas producing apparatuses 102. Suitable compression equipment can be included in the conduit system 101 to transfer the collected gases into the conduit 53. Where the gases collected in the system 101 include valuable components such as hydrogen or hydrocarbons, these components can be separated out before the exhaust gases are transferred into the conduit 53.

The power fluid which is heated by exhaust gases passing through the two stage heat exchanger 35 is used to perform useful work. In the preferred embodiment, the heat exchanger coils 39, 40 form the boiler of an external combustion engine. Such an engine typically includes an expansion turbine 91, a condenser 92, and a pump 93, connected in series by conduits 94, 95, 96, 97. Power fluid heated during passage through the coils 39, 40 is expanded in the turbine 91 and serves to drive a generator 99. The power fluid is then ducted through the condenser 92 and the pump 93 for return to the heat exchanger coils 39, 40.

Many power fluids can be used in the system of the present invention including water, ammonia, propane, butane, pentane, hexane, various halogenated methane compounds and lithium bromide. Prehalogenated benzenes are preferred because they can be used in a wide range of temperature without risk of decomposition and toxicity. Moreover prehalobenzenes have the advantage of high molecular weight, low flammability and low corrosivity.

Figure 2:
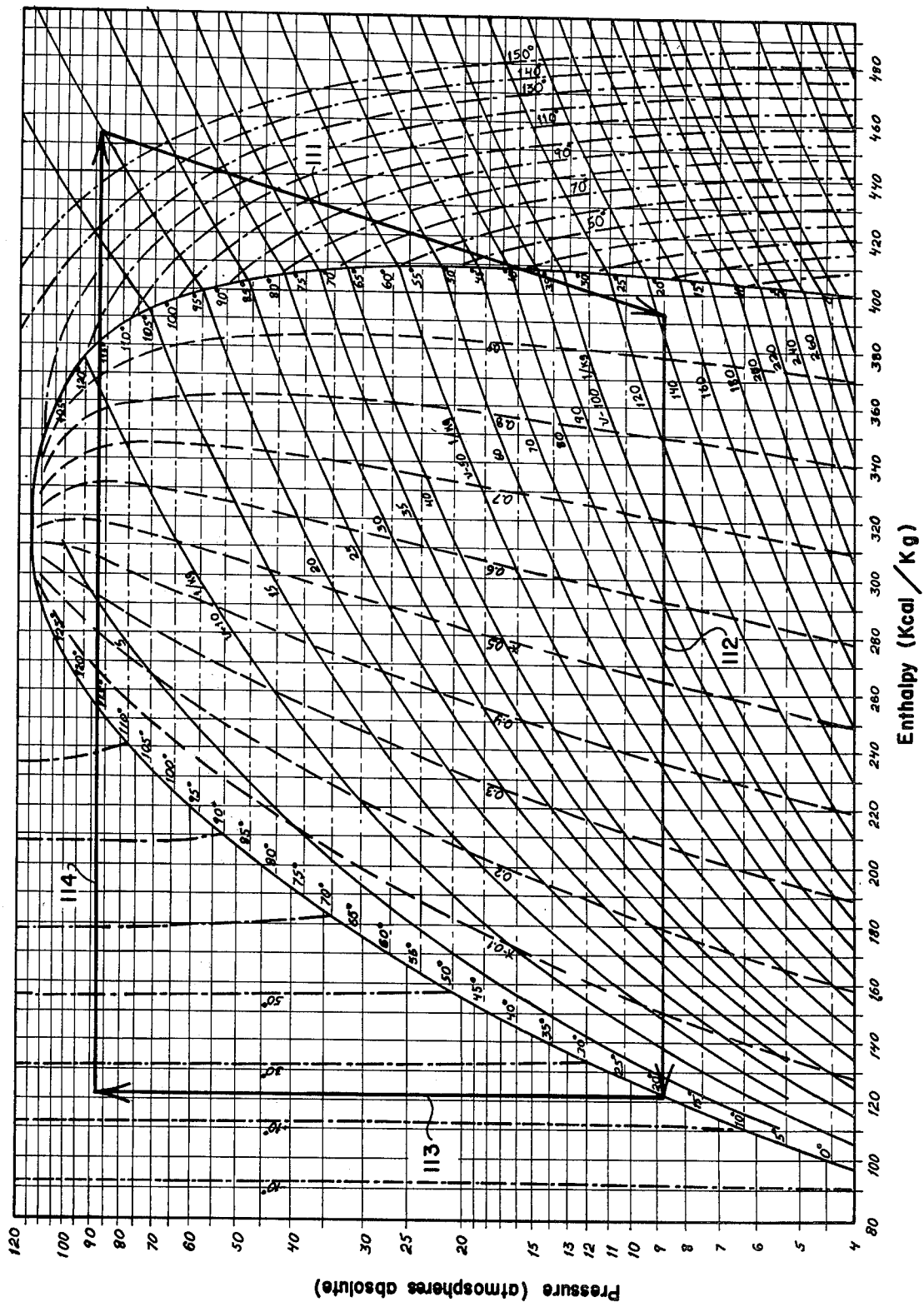
FIG. 2 is a pressure-enthalpy diagram for ammonia with arrows illustrating operation of an external combustion included in the apparatus of FIG. 1.

Referring to FIG. 2, a typical cycle of operation of the external combustion engine is indicated on a pressure-enthalpy diagram for ammonia. Power is generated by the expansion of ammonia in the turbine 91, as indicated by an arrow 111. The ammonia is cooled in the condenser 92, as indicated by an arrow 112. Compression of the ammonia by the pump 93 is indicated by an arrow 113. Heating of the ammonia in the heat exchanger 35 is indicated by an arrow 114.

Although the invention has been described in its preferred form with a certain degree of particularity, it is understood that the present invention disclosure of the preferred form has been made only by way of example and numerous changes in the details of construction and the combination and arrangement of parts may be resorted to without departing from the spirit and the scope of the invention as hereinafter claimed. It is intended that the patent shall cover, by suitable expression in the appended claims, whatever features of patentable novelty exist in the invention disclosed.

What is claimed is:

1. A method of treating hot exhaust gas, comprising the steps of:
    (a) removing particulate matter from the gas;
    (b) productively reclaiming a portion of the heat energy of the hot gas by passing the hot gas in indirect heat exchange relationship with a fluid to concurrently cool the gas and heat the fluid;
    (c) further cooling the gas to effect a separation of harmful, less volatile components from more volatile components;
    (d) compressing the gas at some time prior to the completion of step (c);
    (e) discharging the more volatile components to atmosphere; and
    (f) neutralizing the less volatile components.

2. The method of claim 1 wherein the step of reclaiming heat energy from the hot gas includes cooling the gas to a temperature below its dew point.

3. The method of claim 2 wherein at least a portion of the condensate which results from cooling the gas to a temperature below its dew point is used in the step of neutralizing the less volatile components.

4. The method of claim 1 wherein the step of reclaiming heat energy from the hot gas includes cooling the gas in two stages with first stage cooling reducing gas temperature to a temperature near but still above its dew point, and with second stage cooling reducing gas temperature below its dew point.

5. The method of claim 4 wherein second stage cooling reduces gas temperature to nearly ambient temperature.

6. The method of claim 4 wherein the first and second stage cooling processes are conducted in communicating first and second chambers, and such condensate as results from cooling the gas below its dew point in the second chamber is collected for reclamation.

7. The method of claim 1 wherein the heated fluid is used as a power fluid to produce useful work in an external combustion engine.

8. The method of claim 7 wherein the external combustion engine includes an expansion turbine through which the heated fluid is passed to convert heat energy reclaimed from the hot gas into rotary mechanical motion.

9. The method of claim 1 wherein the step of compressing the gas is conducted, at least in part, between the steps of reclaiming heat energy and further cooling the gas.

10. The method of claim 1 wherein the step of compressing the gas is conducted, at least in part, between the steps of removing particulate matter and reclaiming heat energy.

11. The method of claim 1 wherein the hot exhaust gas being treated is combustion exhaust gas from a fuel burning device having a firebox, and the step of compressing the gas is conducted, at least in part, by operating the firebox of the fuel burning device under pressure whereby hot exhaust gases are discharged under positive pressure from the device.

12. The method of claim 1 additionally including the step of mixing another noxious gas with the exhaust gas prior to further cooling the gas to effect separation, whereby the mixture of exhaust and another gases is concurrently separated into less volatile and more volatile components.

13. The method of claim 12 additionally including the step of collecting gases from a plurality of noxious gas emitting sources to form the another gas.

14. Apparatus for treating hot exhaust gases comprising:
 (a) separator means for removing particulate matter from the hot gas;
 (b) heat exchanger means receiving said hot gas following particulate removal for productively reclaiming a portion of the heat energy thereof by passing the hot gas in indirect heat exchange relationship with a fluid to concurrently cool the gas and heat the fluid;
 (c) condenser means for separating the resulting cooled gas into less volatile and more volatile components;
 (d) discharge means for discharging the more volatile components to atmosphere;
 (e) recovery means for recovering and neutralizing the less volatile components and;
 (f) compressor means for compressing the gas at a point upstream of said recovery means.

15. The apparatus of claim 14 wherein the heat exchanger means includes first and second stages, the first stage being operable to reduce gas temperature to a temperature near but still above its dew point, and the second stage being operable to reduce gas temperature to a temperature below its dew point.

16. The apparatus of claim 15 wherein the first and second stages include first and second communicating chambers, and collection means for collecting such condensate as results from cooling the gas below its dew point in the second chamber.

17. The apparatus of claim 14 wherein said heat exchange means forms part of an external combustion engine operable to produce useful work.

18. The apparatus of claim 17 wherein the external combustion engine includes an expansion turbine through which the heated fluid is passed to convert heat energy reclaimed from the hot gas into rotary mechanical motion.

19. The apparatus of claim 14 wherein the compressor means includes a compressor operable to compress gas downstream from the heat exchanger means and upstream from the recovery means.

20. The apparatus of claim 14 wherein the compressor means includes a blower operable to compress gas downstream from the separator means and upstream from the heat exchanger means.

21. The apparatus of claim 14 wherein the hot exhaust gases are combustion exhaust gases generated in the firebox of a fuel burning device and the compressor means is operable to compress the gas by pressurizing a supply of air to the firebox of the device.

22. The apparatus of claim 14 additionally including means for mixing another noxious gas with the cooled gas prior to entry of the cooled gas into the recovery means, whereby the mixture of exhaust and another gases is concurrently separated into more and less volatile components.

23. The apparatus of claim 22 additionally including means for collecting gases from a plurality of noxious gas emitting devices to provide the another noxious gas.

* * * * *